US009287986B2

(12) United States Patent
Lee et al.

(10) Patent No.: US 9,287,986 B2
(45) Date of Patent: Mar. 15, 2016

(54) LARGE CAPACITY OPTICAL TRANSCEIVER MODULE

(71) Applicant: Electronics and Telecommunications Research Institute, Daejeon (KR)

(72) Inventors: Joon Ki Lee, Daejeon (KR); Sae-Kyoung Kang, Daejeon (KR); Joon Young Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 14/254,552

(22) Filed: Apr. 16, 2014

(65) Prior Publication Data

US 2015/0078758 A1    Mar. 19, 2015

(30) Foreign Application Priority Data

Sep. 13, 2013    (KR) .................. 10-2013-0110550

(51) Int. Cl.
*H04B 10/00*    (2013.01)
*H04B 10/40*    (2013.01)
*H04B 10/50*    (2013.01)
*H04J 14/02*    (2006.01)

(52) U.S. Cl.
CPC .............. *H04B 10/40* (2013.01); *H04B 10/504* (2013.01); *H04J 14/02* (2013.01)

(58) Field of Classification Search
CPC ........................................................ H04B 10/40
See application file for complete search history.

(56) References Cited

U.S. PATENT DOCUMENTS

| 8,472,805 | B2 * | 6/2013 | Lam .................... | H04J 14/0279 398/196 |
| 9,083,468 | B2 * | 7/2015 | Zheng .................. | H04B 10/503 |
| 2005/0220397 | A1 * | 10/2005 | Oikawa .................. | H04J 14/02 385/24 |
| 2009/0080881 | A1 * | 3/2009 | Yokoyama .......... | H04J 14/0227 398/16 |
| 2013/0223484 | A1 * | 8/2013 | Tang ..................... | H04B 10/40 375/219 |
| 2014/0161394 | A1 * | 6/2014 | Ho ....................... | G02B 6/4293 385/78 |
| 2014/0161455 | A1 * | 6/2014 | Ho ....................... | H04B 10/40 398/70 |
| 2014/0161457 | A1 * | 6/2014 | Ho ....................... | H04B 10/40 398/79 |
| 2014/0161459 | A1 * | 6/2014 | Ho ....................... | H04B 10/40 398/79 |
| 2014/0241726 | A1 * | 8/2014 | Ho ....................... | H01S 3/04 398/70 |
| 2014/0341580 | A1 * | 11/2014 | Wang .................... | H04B 10/40 398/79 |
| 2015/0055960 | A1 * | 2/2015 | Zheng .................. | H04B 10/503 398/135 |
| 2015/0078758 | A1 * | 3/2015 | Lee ........................ | H04B 10/40 398/135 |

FOREIGN PATENT DOCUMENTS

KR    1020070006683 A    1/2007

* cited by examiner

*Primary Examiner* — Danny Leung
(74) *Attorney, Agent, or Firm* — William Park & Associates Ltd.

(57) ABSTRACT

A large capacity optical transceiver module includes: an optical transmitter configured to convert electric signals input from an external source into optical signals to transmit the converted signals, in which the electric signals are directly modulated into optical signals in a plurality of sub groups to be multiplexed; and an optical receiver configured to receive optical signals from the external source, and to convert the received optical signals into electric signals to output the converted signals, in which the optical signals are demultiplexed in a plurality of sub groups to be converted into electric signals.

15 Claims, 3 Drawing Sheets

LARGE CAPACITY OPTICAL TRANSCEIVER MODULE

CROSS-REFERENCE TO RELATED APPLICATION(S)

This application claims priority from Korean Patent Application No. 10-2013-0110550, filed on Sep. 13, 2013, in the Korean Intellectual Property Office, the entire disclosure of which is incorporated herein by reference for all purposes.

BACKGROUND

1. Field

The following description relates to a technology for optical communications, and more particularly, to a large capacity optical transceiver module for optical communications.

2. Description of the Related Art

Internet data is continuously increasing with the use of smartphones, tablet PCs, cloud services, and the like. Further, Ethernet signals for the Internet are also becoming high speed and high capacity. After standardization of 10 gigabit (G) Ethernet in 2002, 40G Ethernet and 100G Ethernet were standardized in 2010, and more recently, an optical transceiver module for transmitting 100G Ethernet optical signals has been commercially introduced. As such, 100GBASE-LR4 standard is used, in which four optical signals having a wavelength at a rate of 25 Gb/s are multiplexed into 4×25 Gb/s to transmit 100G Ethernet signals up to 10 kilometers through a single mode fiber (SMF).

In a transceiver module for transmitting 100 G Ethernet optical signals, four electric signals at a rate of 25 Gb/s are input to the inside of a module, to be recovered by a clock and data recovery (CDR), amplified through a laser diode driver (LD driver), and converted into optical signals in a laser diode (LD). The four electric signals are converted into optical signals having LAN-WDM wavelengths of, for example, 1295.56 nm, 1300.05 nm, 1304.58 nm, and 1309.14 nm, which are standardized by IEEE, and wavelength-division multiplexing of the signals is performed through an optical MUX, such that the signals are transmitted as one optical fiber.

In a receiver, if an optical signal having four wavelengths is input, the optical signal is divided per wavelength, and optical to electrical converted and amplified by a photo detector (PD) and a transimpedance amplifier (TIA), to be output as an electric signal. The output electric signal is recovered in a CDR, and is output to the outside of an optical transceiver module. For miniaturization of the optical transceiver module, four LDs and one optical MUX are integrated into one transmitter optical sub-assembly (TOSA), and four PDs and four TIAs are integrated into one receiver optical sub-assembly (ROSA).

Meanwhile, 400G Ethernet is not yet standardized, and an optical transceiver module is not commercialized either. As a method for transmitting 400G Ethernet signals, multiplexing of 16 signals at a rate of 25 Gb/s is generally expected. In this case, 16 LDs and one optical MUX are expected to be integrated into one TOSA, and 16 PDs, 16 TIAs and one optical DMUX are expected to be integrated into one ROSA.

However, with the capacity of an optical transceiver module becoming larger, the number of channels to be optically multiplexed by wavelength division multiplexing is increased, and the number of channels to be integrated is also increased. As the number of channels is increased, the number of LDs and PDs to be integrated into one TOSA and ROSA is also increased, thereby increasing the number of packaging processes and level of packaging, and resulting in a higher risk of defects in manufacturing. Further, even a defect in any one chip, which occurs in the course of manufacturing, is considered a failure of the overall optical transceiver module, thereby reducing mass productivity.

SUMMARY

According to an exemplary embodiment, the following description discloses an optical transceiver module, which reduces failure that may occur in manufacturing, and even if failure occurs, effective repair may be provided to reduce damage in costs and time.

In one general aspect, there is provided an optical transceiver module, which includes: an optical transmitter configured to convert electric signals input from an external source into optical signals to transmit the converted signals, wherein the electric signals are directly modulated into optical signals in a plurality of sub groups to be multiplexed; and an optical receiver configured to receive optical signals from the external source, and to convert the received optical signals into electric signals to output the converted signals, wherein optical signals are demultiplexed in a plurality of sub groups to be converted into electric signals.

In another general aspect, there is provided an optical transceiver module, which includes: an optical transmitter configured to convert electric signals input from an external source into optical signals to transmit the converted signals, wherein the electric signals are externally modulated into optical signals in a plurality of sub groups to be multiplexed; and an optical receiver configured to receive optical signals from the external source, and to convert the received optical signals into electric signals to output the converted signals, wherein the optical signals are demultiplexed in a plurality of sub groups to be converted into electric signals.

In another general aspect, there is provided an optical transceiver module, which includes: an optical transmitter configured to convert electric signals input from an external source into optical signals to transmit the converted signals, wherein the electric signals are directly modulated into optical signals in a plurality of sub groups to be multiplexed; and an optical receiver configured to receive optical signals from the external source, and to convert the received optical signals into electric signals to output the converted signals, wherein the received optical signals are demultiplexed in a single group, and the demultiplexed optical signals are converted into electric signals for each channel to be amplified.

DETAILED DESCRIPTION

Hereinafter, an optical transceiver module will be described in detail with reference to the accompanying drawings. The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
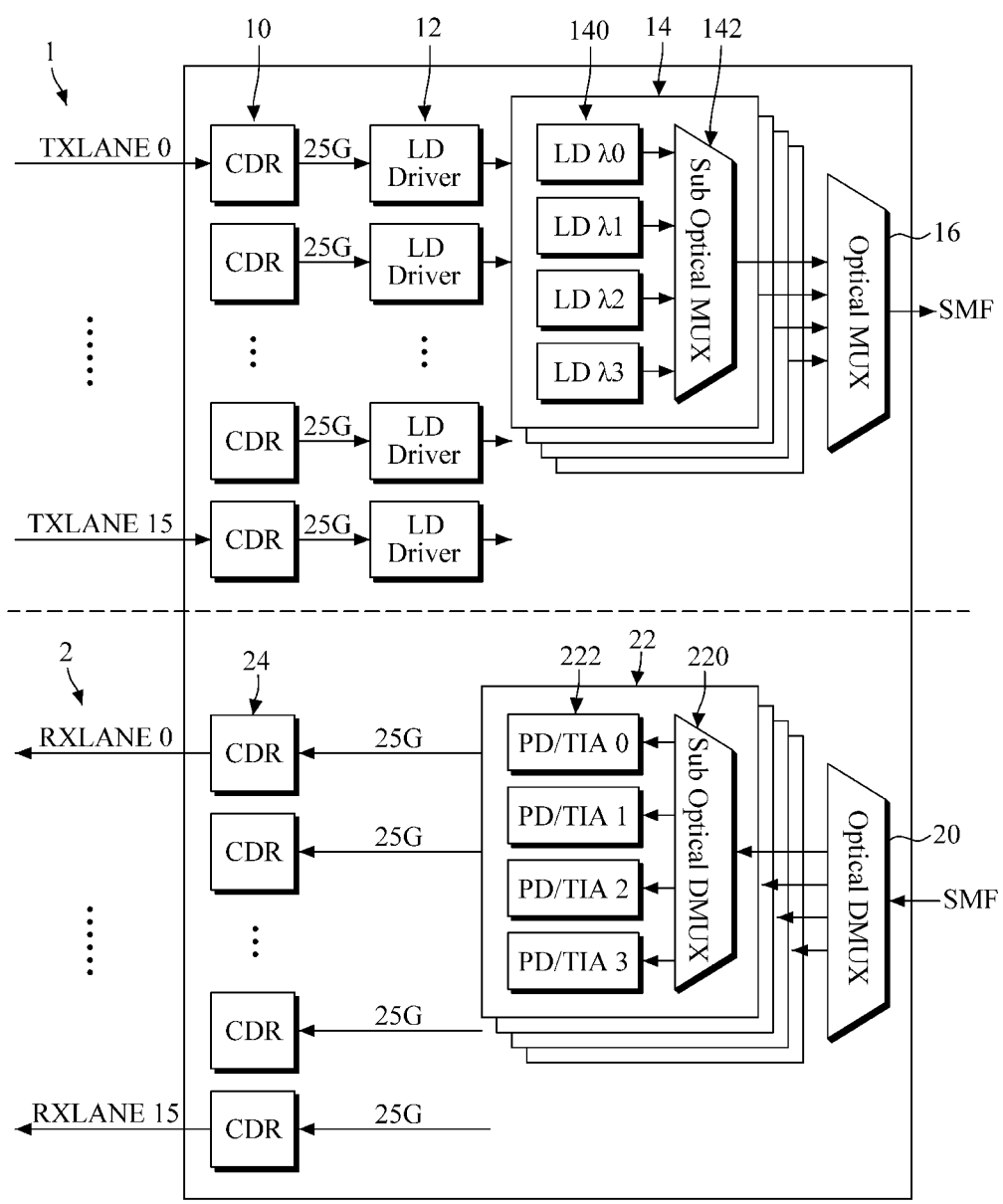
FIG. 1 is a block diagram illustrating an example of an optical transceiver module according to an aspect of an exemplary embodiment.
Figure 2:
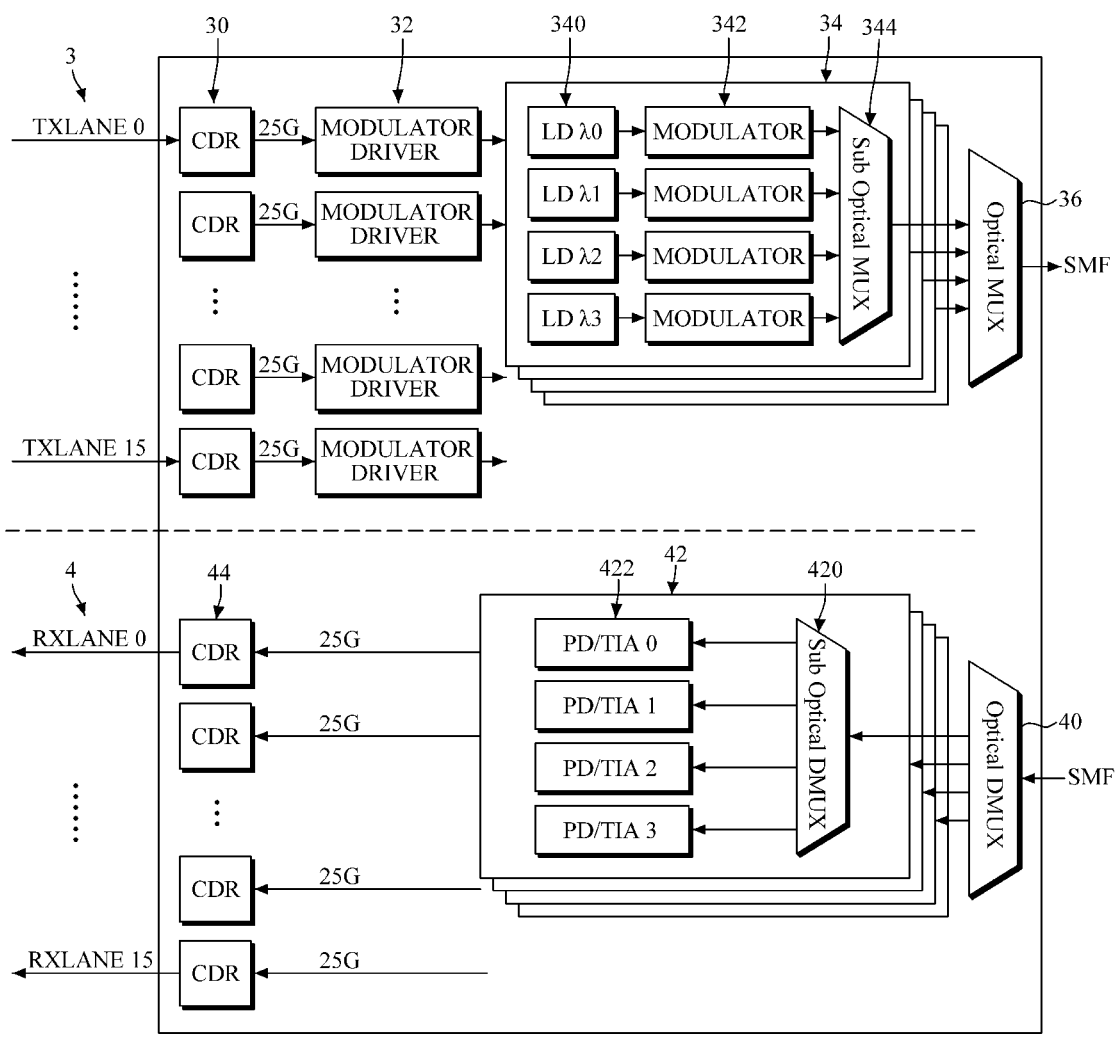
FIG. 2 is a block diagram illustrating an example of an optical transceiver module according to another aspect of an exemplary embodiment.
Figure 3:
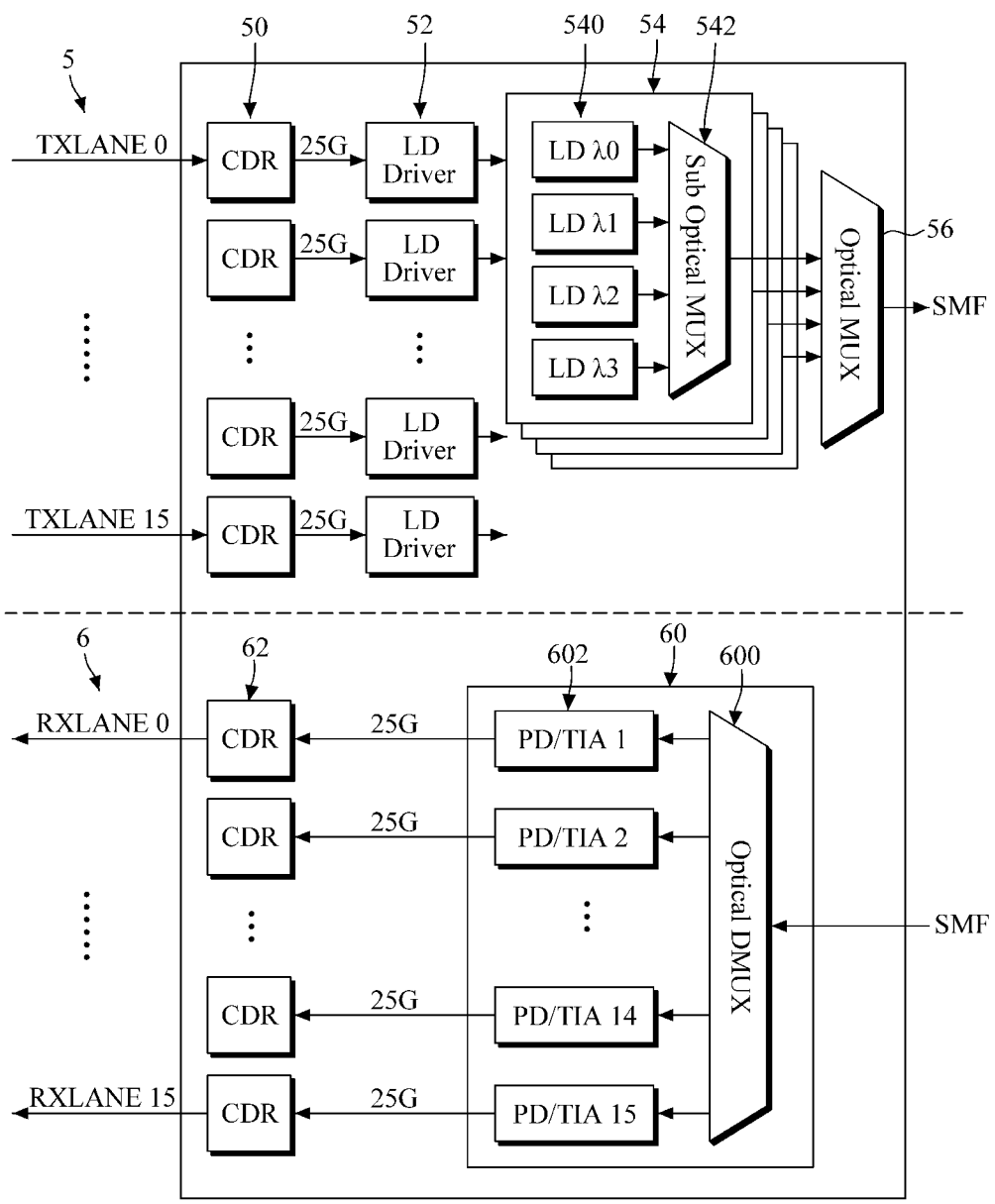
FIG. 3 is a block diagram illustrating an example of an optical transceiver module according to still another aspect of an exemplary embodiment.

As for an optical transmission and/or reception through an optical transceiver module, various exemplary embodiments of an optical transceiver module will be described with reference to FIGS. 1 to 3, in which the number of channels to be integrated into a module is reduced, such that failure in manufacturing modules is reduced, and mass productivity is increased. For better understanding, FIGS. 1 to 3 illustrate 400G Ethernet optical transceiver module at a rate of 400Gb/s. However, an optical transceiver module is not limited to 400G, and a gigabit rate other than 400G may also be available. For example, in the case of 400G Ethernet optical transceiver module, the module has 16 channels with a rate of 25Gb/s per channel, but various modifications may be made to a rate per channel, and the number of channels, depending on a gigabit rate of an optical transceiver module.

FIG. 1 is a block diagram illustrating an example of an optical transceiver module according to an aspect of an exemplary embodiment.

Referring to FIG. 1, an optical transceiver module according to an exemplary embodiment includes an optical transmitter 1, and an optical receiver 2, in which the optical transmitter 1 and the optical receiver 2 each includes a plurality of transmitter optical sub-assemblies (TOSA) and a plurality of receiver optical sub-assemblies (ROSA), which perform grouping of a plurality of optical channels.

Specifically, the optical transmitter 1 includes a plurality of electric signal conditioners 10, a plurality of laser diode drivers 12 (LD driver), a TOSA array 14 including a plurality of TOSAs, and one optical MUX 16, in which each TOSA 14 includes a plurality of laser diodes 140 (LD), and one sub optical MUX 142.

Taking, for example, 400G Ethernet optical transceiver module at a rate of 400Gb/s illustrated in FIG. 1, the optical transmitter 1 includes 16 electric signal conditioners 10, 16 LD drivers 12, a TOSA array 14 including four TOSAs, and one optical MUX 16, in which each TOSA 14 includes four LDs 140, and one sub optical MUX 142.

The electric signal conditioners 10 receive input of electric signals for each channel, and recover the input electric signals. The electric signal conditioner 10 may be a clock and a data recovery (CDR). The electric signal conditioners 10 may reduce waveform distortion of the input electric signals, as electric signals may be distorted when high-rate signals are input from a system board through a printed circuit board (PCB) or a connector.

The LD drivers 12 receive input of electric signals from each electric signal conditioner 10, and to amplify the input electric signals for each channel. As input signals may become weak in size as well as in shape, the LD drivers 12 amplify the input signals. Further, the LD drivers 12 may enable or disable LDs 140 inside a plurality of TOSAs 14. In this case, the LDs 140 in each TOSA 14, which are driven by bias voltage generated from each LD driver 12 in sub groups, may directly modulate electric signals into optical signals.

The TOSA array 14, which is grouped into a plurality of sub groups, directly modulates electric signals, which are amplified by each LD driver 12 in each sub group, into optical signals, and to multiplex the signals. For example, referring to FIG. 1, the TOSA array 14 is grouped into four sub groups, and four channels are formed in each sub group. Therefore, signals of 4×4×25G=400Gb/s may be received in total. Accordingly, the number of channels to be integrated into the TOSA array 14 may be reduced by ¼, compared with a case where the TOSA array 14 is not grouped into four sub groups.

Specifically, the TOSA array 14 includes the LDs 140 and the sub optical MUX 142. The LDs 140 in each TOSA receive input of electric signals amplified by each LD driver 12, and convert the input electric signals into optical signals in each sub group. The sub optical MUXs 142 in each TOSA 14 combine optical signals converted through each LD 140 in sub groups. Each sub optical MUX 142 may have an input port, which receives input of optical signals modulated by each LD 140 in sub groups, and an output port, which outputs optical signals input through the input port, and combined in sub groups.

Each sub optical MUX 142 illustrated in FIG. 1 may be replaced with an optical power combiner. In this case, each TOSA 14 with four channels may include four LDs 140 each having a different wavelength in LAN-WDM wavelength band, and one sub optical MUX 142, or a sub optical power combiner. The optical MUX 16 combines optical signals output from each TOSA 14, and outputs the combined signals as one optical fiber.

Meanwhile, the optical receiver 2 includes one optical DMUX 20, a ROSA array 22 including a plurality of ROSAs, and a plurality of electric signal conditioners 24, in which each ROSA 22 includes one sub optical DMUX 220, a plurality of photo diodes (PD)/transimpedance amplifier (TIA) 222.

Taking, for example, 400G Ethernet optical transceiver module with a rate of 400Gb/s illustrated in FIG. 1, the optical receiver 2 includes one optical DMUX 20, a ROSA array 22 including four ROSAs, and 16 electric signal conditioners 24, in which each ROSA 22 includes one sub optical DMUX 220, and four PDs/TIAs 222.

The ROSA array 22, which is grouped into a plurality of sub groups, demultiplexes optical signals demultiplexed by the optical DMUX 20 in sub groups, and to modulate the signals into electric signals. For example, referring to FIG. 1, the ROSA array 22 is grouped into four sub groups, and four channels are formed in each sub group. Therefore, signals of 4×4×25G=400Gb/s may be received in total. Accordingly, the number of channels to be integrated into the ROSA array 22 may be reduced by ¼.

Specifically, each ROSA 22 includes one sub optical DMUX 220, and the PD/TIA 222, in which the sub optical DMUX 220 receives optical signals demultiplexed by the optical DMUX 20 in sub groups, and divides the demultiplexed optical signals. Further, the PD/TIA 222 detects optical signals divided in sub groups by the sub optical DMUX 220, to convert the detected optical signals into electric signals, and amplify the converted signals.

Each sub optical DMUX 220 includes an input port, which receives input of optical signals demultiplexed by the optical DMUX 2 in sub groups, and an output port, which outputs optical signals input through the input port, and demultiplexed in sub groups.

The electric signal conditioners 24 on the receiving side receive input of electric signals for each channel from each ROSA 22, and recover the received electric signals. The electric signal conditioner 24 may be a CDR.

FIG. 2 is a block diagram illustrating an example of an optical transceiver module according to another aspect of an exemplary embodiment.

Referring to FIG. 2, an optical transceiver module, according to an exemplary embodiment, includes an optical transmitter 3 and an optical receiver 4, in which the optical transmitter 3 externally modulates electric signals into optical signals in a plurality of sub groups, to multiplex the modulated signals, and the optical receiver 4 demultiplexes the optical signals in a plurality of sub groups, to convert the demultiplexed signals into electric signals. In this case, a TOSA array 34 of the optical transmitter 3 uses an external modulator 342. That is, LDs 340 are not modulated directly, but are externally modulated by using a silicon photonics external modulator 342.

Specifically, the optical transmitter 3 includes a plurality of modulator drivers 32, a TOSA array 34, and one optical MUX 36, in which each TOSA array 34 includes a plurality of LDs 340, a plurality of external modulators 342, and one sub optical MUX 344.

Taking, for example, 400 G Ethernet optical transceiver module with a rate of 400 Gb/s illustrated in FIG. 2, the optical transmitter 3 includes 16 electric signal conditioners 30, 16 modulator drivers 32, a TOSA array 34 including four TOSAs, and one optical MUX 36, in which each TOSA 34 includes four LDs 340, four external modulators 342, and one sub optical MUX 344.

Each modulator driver 32 generates driving voltage for external modulation according to electric signals input from an external source for each channel. Each TOSA 34, which is grouped into a plurality of sub groups, externally modulates electric signals into optical signals in sub groups, and multiplexes the modulated signals. Further, the optical MUX 36 multiplexes optical signals output for each TOSA 34.

The LDs 340, which constitute each TOSA 34, generate optical signals in sub groups, and the external modulator 342 is driven by bias voltage generated by each modulator driver 32 in sub groups, and externally modulates optical signals generated by each LD 340. In addition, each sub optical MUX 34 combines optical signals, which are modulated by the external modulator 342 in sub groups. The one optical MUX 36 multiplexes optical signals, which are output for each TOSA 34.

The sub optical MUXs 344 illustrated in FIG. 2 may be replaced with optical power combiners. In this case, each TOSA 14 with four channels may be configured to include four LDs 340 each having a different wavelength in LAN-WDM wavelength band, four external modulators 342, and a sub optical MUX 344, or a sub optical power combiner.

Meanwhile, the optical receiver 4 includes an optical DMUX 40, a ROSA array 42 including a plurality of ROSAs, and a plurality of electric signal conditioners 44, in which each ROSA 42 includes a sub optical DMUX 422, and a plurality of PDs/TIAs 420.

Taking, for example, 400G Ethernet optical transceiver module with a rate of 400 Gb/s illustrated in FIG. 2, the optical transmitter 4 includes an optical DMUX 40, a ROSA array 42 including four ROSAs, and 16 electric signal conditioners 44, in which each ROSA 42 includes a sub optical DMUX 422, and four PDs/TIAs 420.

The ROSA array 42, which is grouped into a plurality of sub groups, demultiplexes optical signals demultiplexed by the optical DMUX 40 in sub groups, and modulates the signals into electric signals. For example, referring to FIG. 2, the ROSA array 42 is grouped into four sub groups, and four channels are formed in each sub group. Therefore, signals of 4×4×25G=400Gb/s may be received in total. Accordingly, the number of channels to be integrated into the ROSA array 42 may be reduced by ¼.

Specifically, each ROSA 42 includes the one sub optical DMUX 422, and the PD/TIA 420, in which the sub optical DMUX 422 receives optical signals demultiplexed by the optical DMUX 40 in sub groups, and divides the received signals. Further, the PD/TIA 420 detects optical signals divided by the sub optical DMUX 422 in sub groups, to convert the detected optical signals into electric signals, and amplify the converted electric signals.

Each sub optical DMUX 422 includes an input port, which receives input of optical signals demultiplexed by the optical DMUX 4 in sub groups, and an output port, which outputs optical signals input through the input port, and demultiplexed in sub groups. The electric signal conditioners 44 receive input of electric signals from each ROSA 42 for each channel, and recover the input electric signals.

FIG. 3 is a block diagram illustrating an example of an optical transceiver module according to still another aspect of an exemplary embodiment.

Referring to FIG. 3, if a two-tier sub optical DMUX is used in an optical receiver 6, insertion loss may be increased. However, as receiving sensitivity is important for the optical receiver 6, all channels may be integrated into a single ROSA 60, as illustrated in FIG. 3. That is, an optical transmitter 5 of an optical transceiver module, according to an exemplary embodiment, includes a plurality of TOSAs 54 for grouping a plurality of optical channels, whereas, in the optical receiver 6, all channels are integrated into a single ROSA 60, as receiving sensitivity is important.

Specifically, the optical transmitter 5 includes a plurality of electric signal conditioners 50, a plurality of LD drivers 52, a TOSA array 54 including a plurality of TOSAs, and one optical MUX 56, in which each TOSA 54 includes a plurality of LDs 540, and one sub optical MUX 542.

Taking, for example, 400G Ethernet optical transceiver module with a rate of 400Gb/s illustrated in FIG. 3, the optical transmitter 5 includes 16 electric signal conditioners 50, 16 LD drivers 52, a TOSA array 54 including four TOSAs, and one optical MUX 56, in which each TOSA 54 includes four LDs 540, and one sub optical MUX 542.

The electric signal conditioners 50 receive input of electric signals for each channel, and recover the input electric signals. The electric signal conditioners 50 may reduce waveform distortion of the input electric signals, as electric signals may be distorted when high-rate signals are input from a system board through a printed circuit board (PCB) or a connector.

The LD drivers 52 receive input of electric signals from each electric signal conditioner 50, and to amplify the input electric signals for each channel. As input signals may become weak in size as well as in shape, the LD drivers 52 amplify the input signals. Further, the LD drivers 52 may enable or disable the LDs 540 inside a plurality of TOSAs 54. In this case, the LDs 540 in each TOSA 54 are driven by bias voltage generated from each LD driver 52 in sub groups, and may directly modulate electric signals into optical signals.

The TOSA array 54, which is grouped into a plurality of sub groups, directly modulates electric signals amplified by each LD driver 52 in sub groups into optical signals, and multiplexes the signals. For example, referring to FIG. 3, the TOSA array 54 is grouped into four sub groups, and four channels are formed in each sub group. Therefore, signals of 4×4×25G=400Gb/s may be received in total. Accordingly, the number of channels to be integrated into the TOSA array 54 may be reduced by ¼.

Specifically, the TOSA array 54 includes the LDs 540 and a sub optical MUX 542. The LDs 540 in each TOSA receive input of electric signals, which are amplified by each LD driver 52 in each sub group, and convert the input electric signals into optical signals. The sub optical MUXs 542 in each TOSA 54 combine optical signals converted through each LD 540 in sub groups.

Each sub optical MUX 542 may include an input port, which receives input of optical signals modulated by each LD 540 in sub groups, and an output port, which outputs optical signals input through the input port, and combined in sub groups.

The sub optical MUXs 542 illustrated in FIG. 3 may be replaced with optical power combiners. In this case, each TOSA 54 with four channels may include four LDs 540 each having a different wavelength in LAN-WDM wavelength band, and a sub optical MUX 542, or a sub optical power combiner. The optical MUX 56 combines optical signals output from each TOSA 54, and outputs the combined optical signals to a single optical fiber.

Meanwhile, the optical receiver 6 includes one optical DMUX 600, and one ROSA 60 including a plurality of PDs/TIAs 602, in which the optical DMUX 600 divides received optical signals, and each PD/TIA 602 detects optical signals divided by the optical DMUX 600, to convert the detected optical signals into electric signals for each channel, and amplify the converted electric signals for each channel.

With reference to FIGS. 1 to 3, exemplary embodiments of TOSA and ROSA with four channels, including an optical MUX and an optical DMUX, are described, in which failure may be reduced, and mass productivity may be increased. Further, multiplexing and demultiplexing of TOSA and ROSA with a 4×N channel unit may be performed with the development of chip and packaging technologies. In addition, regarding a modulating method applied to an individual wavelength channel, the method is not limited to a conventional method of non-return to zero on-off keying (NRZ-OOK), but may also apply to a multi-level signal such as pulse amplitude modulation (PAM)-4, and PAM-8. In addition, a rate per channel is not limited to 25 Gb/s, and the number of channels is not limited to 16.

According to an aspect of an exemplary embodiment, in order to enlarge the capacity of an optical transceiver module, the number of channels to be integrated into one TOSA and ROSA is reduced by a multiple of four, and an optical MUX and an optical DMUX are used separately, thereby reducing failure rate in manufacturing TOSA and RPSA, and increasing mass productivity. That is, by dividing TOSA and ROSA, mass production of the optical transceiver module may be enhanced, and even when failure occurs during operation, only a defective part of TOSA or ROSA may be replaced, thereby enabling effective repair.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. An optical transceiver module, comprising:
   a self-contained optical transmitter configured to convert externally input electric signals into optical signals to transmit the converted input signals, wherein the externally input electric signals are directly modulated into optical signals in a plurality of sub groups to be multiplexed; and
   a self-contained optical receiver configured to receive externally input optical signals, and to convert the received optical signals into electric signals to output the converted received signals, wherein optical signals are demultiplexed in a plurality of sub groups to be converted into electric signals,
   wherein the self-contained optical transmitter includes each of:
   a plurality of electric signal conditioners configured to recover the externally input;
   a plurality of laser diode drivers configured to amplify the externally input electric signals recovered by each electric signal conditioner;
   a transmitter optical sub-assembly array, which is grouped into a plurality of sub groups, and is configured to directly modulate electric signals, which are amplified by each laser diode driver in sub groups, into optical signals, and to multiplex the modulated signals; and
   an optical MUX configured to multiplex optical signals output for each transmitter optical sub-assembly.

2. The optical transceiver module of claim 1, wherein each transmitter optical sub-assembly comprises:
   a plurality of laser diodes, which is driven by bias voltage generated from each laser diode driver in sub groups, to directly modulate electric signals into optical signals; and
   a sub optical MUX configured to combine optical signals modulated by each laser diode in sub groups.

3. The optical transceiver module of claim 2, wherein each sub optical MUX comprises:
   an input port configured to receive input of optical signals modulated by each laser diode in sub groups; and
   an output port configured to output optical signals input through the input port, and combined in sub groups.

4. The optical transceiver module of claim 1, wherein the self-contained optical receiver includes each of:
   an optical DMUX configured to demultiplex externally input optical signals;
   a receiver optical sub-assembly array, which is grouped into a plurality of sub groups, and is configured to demultiplex optical signals input from the optical DMUX, and to convert the demultiplexed signals into electric signals; and
   a plurality of electric signal conditioners configured to receive input of electric signals from each receiver optical sub-assembly for each channel, and recover the input electric signals.

5. The optical transceiver module of claim 4, wherein each receiver optical sub-assembly comprises:
   a sub optical DMUX configured to receive optical signals demultiplexed by the optical DMUX in sub groups, and to divide the received signals;
   a plurality of photo diodes configured to detect optical signals divided by the sub optical DMUX in sub groups, and to convert the detected optical signals into electric signals; and
   a plurality of transimpedance amplifiers configured to amplify electric signals converted through the plurality of photo diodes in sub groups.

6. The optical transceiver module of claim 5, wherein each sub optical DMUX comprises:
   an input port configured to receive input of optical signals demultiplexed by the optical DMUX in sub groups; and
   an output port configured to output optical signals input through the input port, and demultiplexed in sub groups.

7. An optical transceiver module, comprising:
   a self-contained optical transmitter configured to convert externally input electric signals into optical signals to transmit the converted signals, wherein the externally input electric signals are externally modulated into optical signals in a plurality of sub groups to be multiplexed; and a self-contained optical receiver configured to receive externally input optical signals, and to convert the received optical signals into electric signals to output the converted signals, wherein the optical signals are demultiplexed in a plurality of sub groups to be converted into electric signals, wherein the self-contained optical transmitter includes each of:
- a plurality of modulator drivers configured to generate driving voltage for external modulation according to the externally input electric signals for each channel;
- a transmitter optical sub-assembly array, which is grouped into a plurality of sub groups, and is configured to externally modulate electrical signals into optical signals in sub groups; and
- an optical MUX configured to multiplex optical signals output for each transmitter optical sub-assembly.

8. The optical transceiver module of claim 7, wherein each transmitter optical sub-assembly comprises:
- a plurality of laser diodes configured to generate optical signals in sub groups;
- an external modulator, which is driven by bias voltage generated from each modulator driver in sub groups, and is configured to externally modulate optical signals generated by each laser diode; and
- a sub optical MUX configured to combine optical signals modulated by the external modulator in sub groups.

9. The optical transceiver module of claim 7, wherein the self-contained optical receiver includes each of:
- an optical DMUX configured to demultiplex the externally input optical signals;
- a receiver optical sub-assembly array, which is grouped into a plurality of sub groups, and is configured to demultiplex optical signals received from the optical DMUX in sub groups, and to convert the demultiplexed signals into electric signals; and
- a plurality of electric signal conditioners configured to receive input of electric signals from each receiver optical sub-assembly for each channel, and to recover the input electric signals.

10. The optical transceiver module of claim 9, wherein each receiver optical sub-assembly comprises:
- a sub optical DMUX configured to receive optical signals demultiplexed by the optical DMUX in sub groups, and to divide the received signals;
- a plurality of photo diodes configured to detect optical signals divided by the sub optical DMUX in sub groups, and to convert the detected optical signals into electric signals; and
- a plurality of transimpedance amplifier configured to amplify electric signals converted by the plurality of photo diodes in sub groups.

11. The optical transceiver module of claim 10, wherein each sub optical DMUX comprises:
- an input port configured to receive input of optical signals demultiplexed by the optical DMUX in sub groups; and
- an output port configured to output optical signals input through the input port, and demultiplexed in sub groups.

12. An optical transceiver module, comprising:
- a self-contained optical transmitter configured to convert externally input electric signals into optical signals to transmit the converted signals, wherein the externally input electric signals are directly modulated into optical signals in a plurality of sub groups to be multiplexed; and
- a self-contained optical receiver configured to receive externally input optical signals, and to convert the received optical signals into electric signals to output the converted received signals, wherein the received optical signals are demultiplexed in a single group, and the demultiplexed optical signals are converted into electric signals for each channel to be amplified, wherein the self-contained optical receiver includes one receiver optical sub-assembly, wherein the receiver optical sub-assembly includes each of:
- an optical DMUX configured to divide the received optical signals;
- a plurality of photo diodes configured to detect optical signals divided by the optical DMUX, and to convert the detected optical signals into electric signals for each channel; and
- a plurality of transimpedance amplifier configured to amplify electric signals converted by the plurality of photo diodes for each channel.

13. The optical transceiver module of claim 12, wherein the optical transmitter comprises:
- a plurality of electric signal conditioners configured to recover the externally input electric signals input;
- a plurality of laser diode drivers configured to amplify the externally input electric signals recovered by each electric signal conditioner;
- a transmitter optical sub-assembly array, which is grouped into a plurality of sub groups, and is configured to directly modulate electric signals amplified by each laser diode driver in sub groups into optical signals, and to multiplex the modulated signals; and
- an optical MUX configured to multiplex optical signals output from each transmitter optical sub-assembly.

14. The optical transceiver module of claim 13, wherein each transmitter optical sub-assembly comprises:
- a plurality of laser diodes, which is driven by bias voltage generated from each laser diode driver in sub groups, and is configured to directly modulate electric signals into optical signals; and
- a sub optical MUX configured to combine optical signals modulated by each laser diode in sub groups.

15. The optical transceiver module of claim 14, wherein each sub optical MUX comprises:
- an input port configured to receive input of optical signals modulated by each laser diode in sub groups; and
- an output port configured to output optical signals input through the input port and combined in sub groups.

* * * * *